United States Patent

Broyles et al.

[11] 4,037,231
[45] July 19, 1977

[54] VARIABLE CLOCK RATE RESONANT PRINTER WITH NONLINEAR CORRECTION

[75] Inventors: Douglas Wright Broyles, San Jose; Troy Cecil Stark, Campbell, both of Calif.

[73] Assignee: The Singer Company, Binghamton, N.Y.

[21] Appl. No.: 640,996

[22] Filed: Dec. 15, 1975

[51] Int. Cl.² .................................................. G06K 15/12
[52] U.S. Cl. ........................................ 346/108; 350/6; 354/5; 358/293; 358/256
[58] Field of Search ................... 346/109, 108; 354/5, 354/7; 350/6; 178/7.6; 358/285, 288, 293, 300, 302, 256

[56] References Cited

U.S. PATENT DOCUMENTS

| | | | |
|---|---|---|---|
| 3,389,403 | 6/1968 | Cottingham et al. | 346/108 |
| 3,532,408 | 10/1970 | Dostal | 350/6 |
| 3,709,117 | 1/1973 | Sansone | 354/7 |
| 3,751,587 | 8/1973 | Insler et al. | 346/76 L X |
| 3,867,571 | 2/1975 | Starkweather et al. | 178/7.6 |
| 3,898,627 | 8/1975 | Hooker et al. | 340/172.5 |

*Primary Examiner*—Joseph W. Hartary
*Attorney, Agent, or Firm*—Paul Hentzel; James C. Kesterson

[57] ABSTRACT

A mirror driven by a resonant mechanical oscillator is used to scan a modulated laser beam across a rotating dielectric drum. The incident laser beam line scans the drum to form a charge image thereon which is toned as the drum rotates through a toner bath. The toned image is then transferred to paper by rolling contact. The laser beam scan velocity across the drum varies sinusoidally because of the resonant nature of the drive system. The data flow which modulates the laser beam is rate-controlled by a variable clock to accommodate the periodic variations in scanning velocity. The modulation rate — the data flow rate — is varied periodically to match the periodically varying scan rate to produce a uniform image element density or spacing across the scan lines of the dielectric surface. The variable clock is also applied to the laser beam modulator to compensate for the periodic variations in the charge density of the image caused by the nonlinear scan velocity.

17 Claims, 5 Drawing Figures

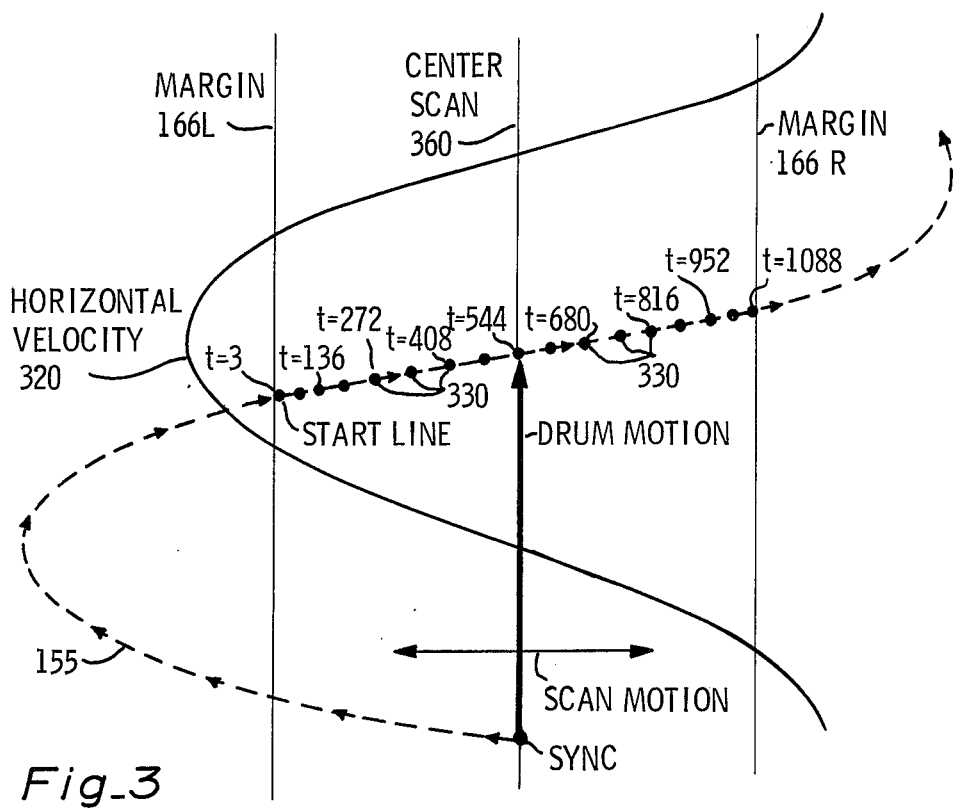
Fig_3
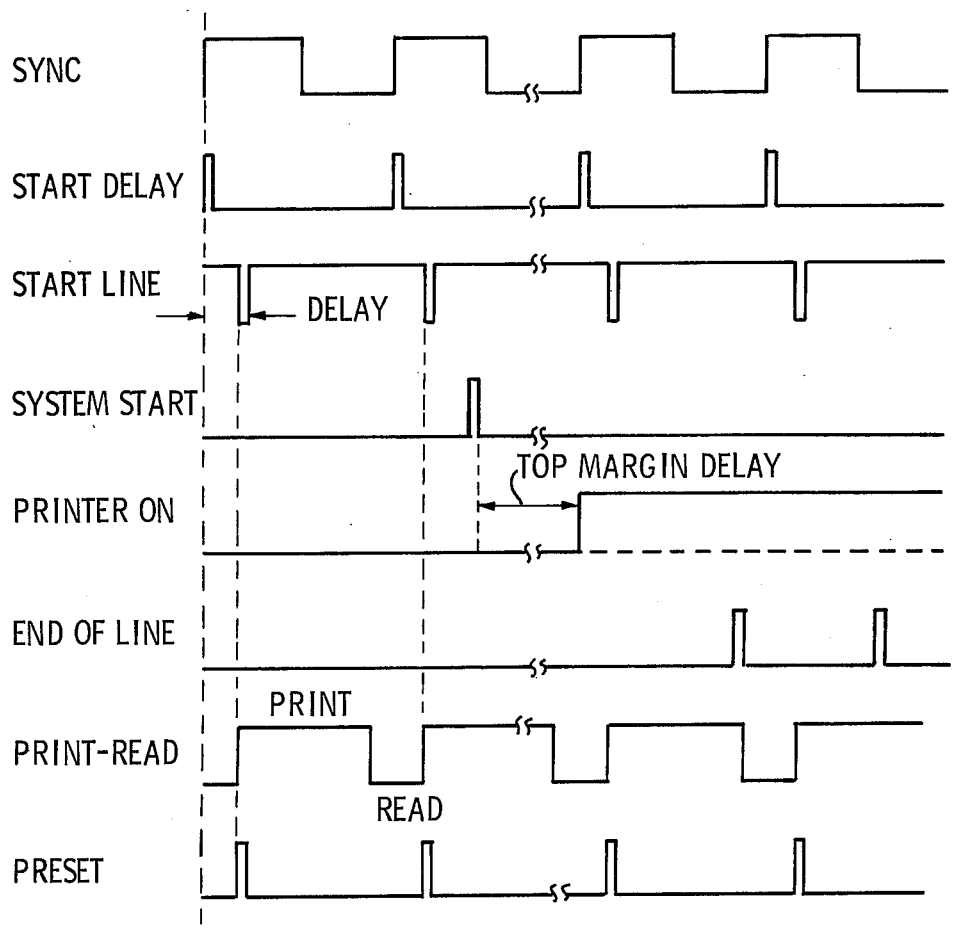
Fig_5

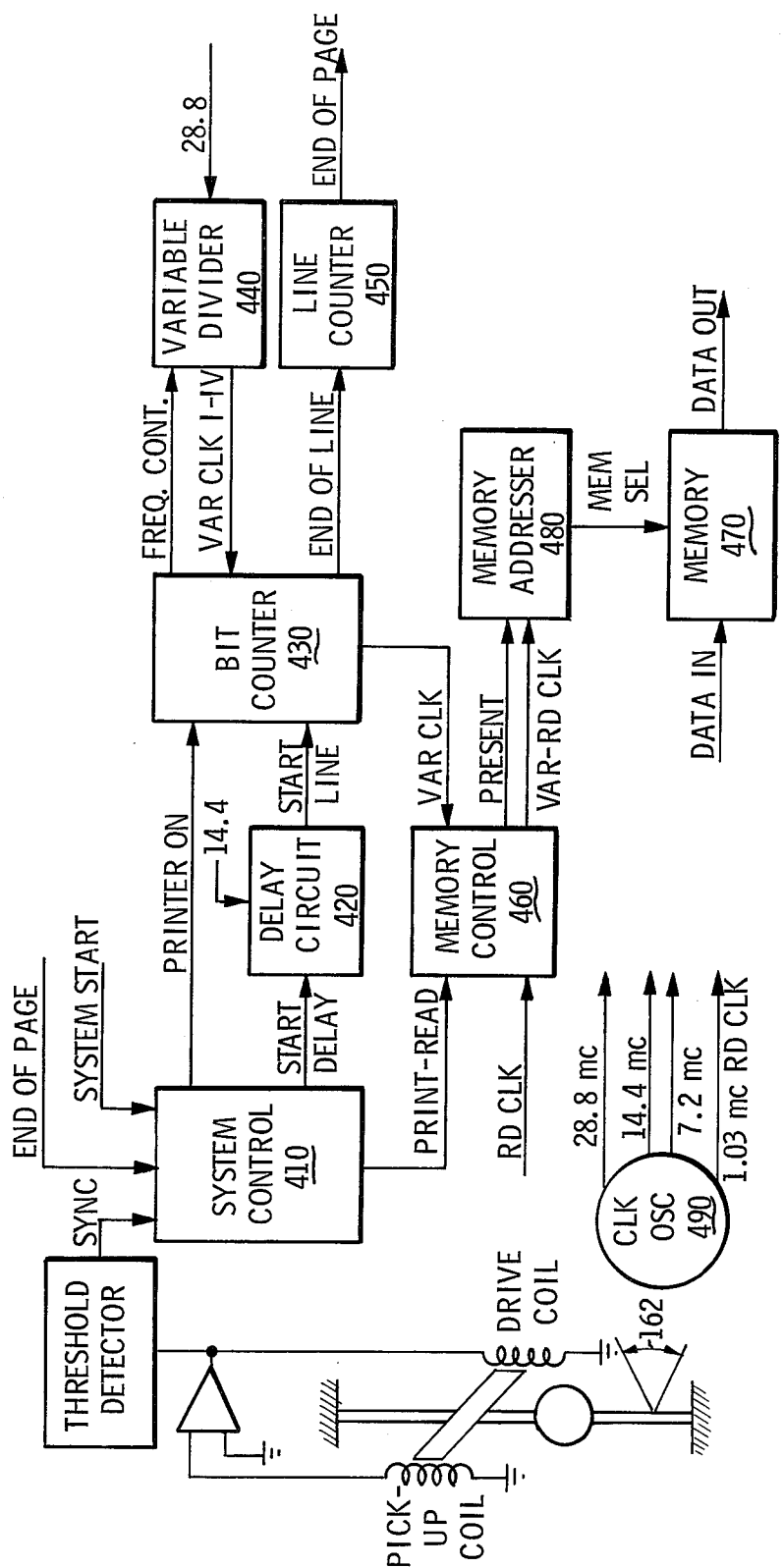
Fig_4

VARIABLE CLOCK RATE RESONANT PRINTER WITH NONLINEAR CORRECTION

BACKGROUND OF THE INVENTION

1. Field of the Invention

This invention relates to printers with sinusoidal scanning systems and more particularly to such printers having a complementary data flow rate for providing uniform picture element density across each scan line.

2. Description of the Invention

Heretofore, sinusoidal variations in mechanical oscillator scanning rates have been avoided by using a multifacet rotating mirror or prism with a constant speed drive. The incredible machine tolerance in grinding and polishing each of the facets creates a huge cost barrier. Wear of the moving parts of the constant speed drive creates a difficult alinement problem. A prior art laser printer is described in "Laser Printing System Tested by Bell Labs," Electronic Design, page 25, Dec. 7, 1972.

SUMMARY OF THE INVENTION

It is therefore an object of this invention to provide:
a printer with uniform picture element density image;
the above printer employing a nonlinear scan line drive motion;
the above printer employing a sinusoidal oscillator with a stable natural frequency of resonance;
the above printer employing a rugged, simple, maintenancefree mechanical oscillator;
a scan line printer having a nonlinear scan velocity and a matching nonlinear data flow rate; and
the above printer having a complementary nonlinear scanning beam intensity.

BRIEF DESCRIPTION OF THE DRAWING

Further objects and advantages of the present scanner printer and the operation of the variable data flow rate will become apparent to those skilled in the art from the following detailed description taken in conjunction with the drawings in which:

FIG. 3 illustrates trace path 155 of modulated laser beam 138 showing the spacing nonlinearities of picture elements 330 introduced by a constant modulation rate;

FIG. 4 shows a block diagram of data rate controller 120 of FIG. 1 which compensates for the spacing nonlinearities of FIG. 3; and FIG. 5 is a timing diagram of the control signals for controller 120.

THE SCANNER-PRINTER SYSTEM

Figure 1:
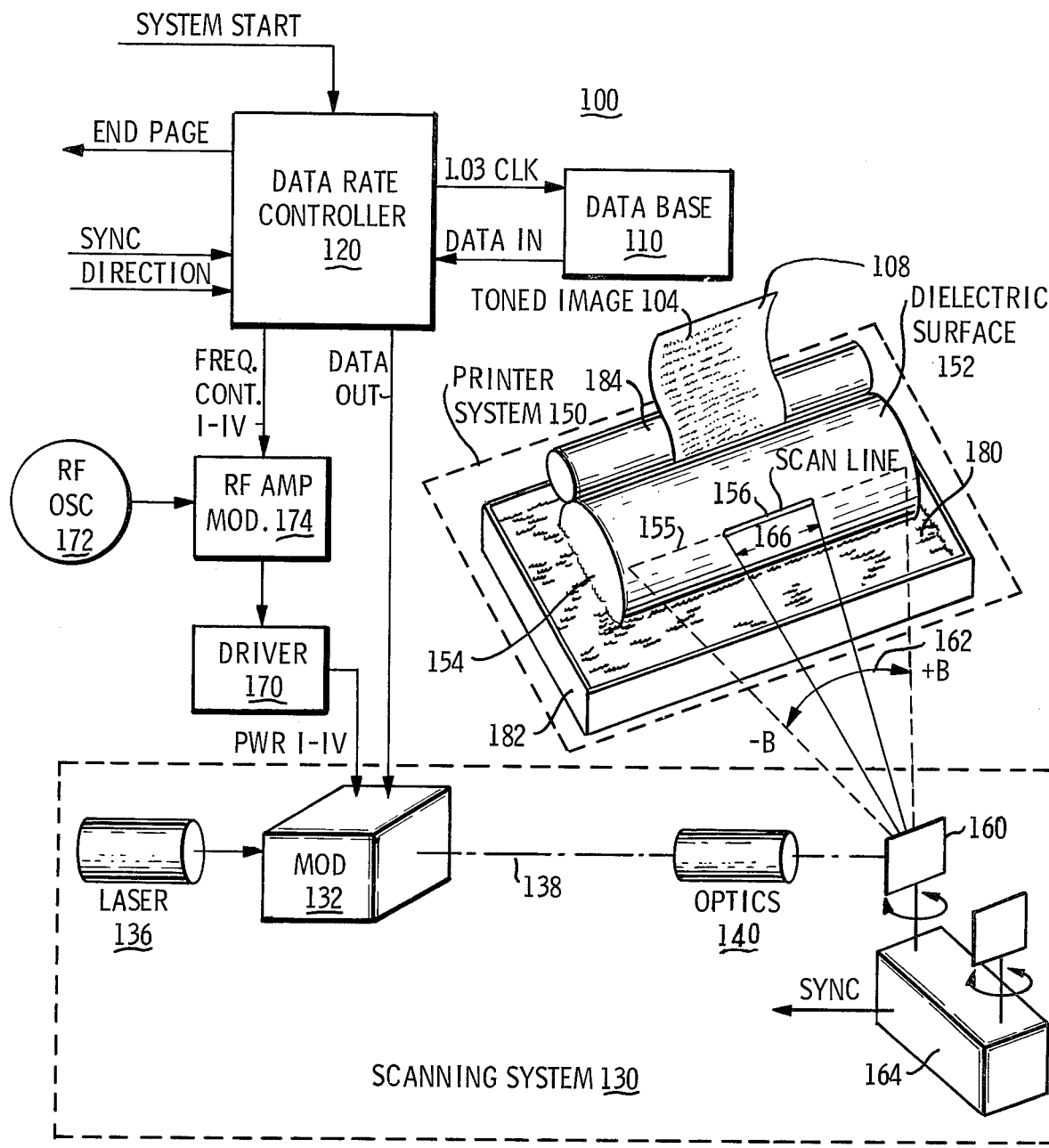
FIG. 1 is a block diagram of scanner printer 100.
Figure 2:
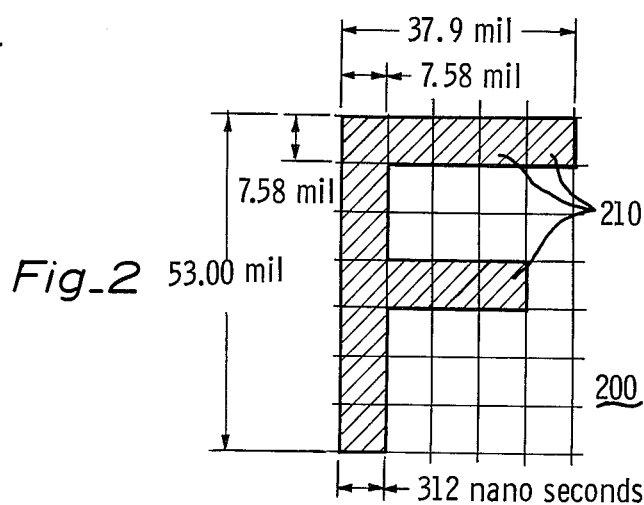
FIG. 2 is a representation of a typical alpha-numeric character 200 printed by the scanner printer.

FIG. 1 shows a scanner-printer system 100 which forms a toned image 104 onto a recording medium such as paper 108 from DATA IN (digital picture elements) stored in data base 110. The picture elements are printed on paper 108 in an alpha-numeric character format (preferably 7×5 as shown in FIG. 2). A data flow rate controller 120 receives input data from data base 110, preferable in raster line data units. Rate controller 120 periodically varies the data flow rate within a single raster line in sinusoidal fashion causing DATA OUT from rate controller 120 to have a higher flow rate towards the center of each raster line and a lower flow rate at the beginning and end. DATA OUT is applied to a nonlinear scanning system 130 which has a sinusoidally varying scan motion which features with the sinusoidal variation of DATA OUT to produce an evenly spaced image 108. A modulator 132 within system 130 impresses DATA OUT into energy beam 134 from energy source 136 to form intensity modulated beam 138. The energy is preferably light, and more particularly laser energy, because of its single-frequency, collimated characteristics. Modulator 132 is preferably an acoustical optical modulator which deflects laser team 134 slightly in response to DATA OUT voltage pulses.

An optical system 140 within scanning system 130 focuses deflected beam 138 into printing system 150, and more particularly onto the dielectric surface 152 of rotating drum 154 forming a small writing dot or picture element. A pivoting light-directing device such as mirror 160 reflects the focused modulated beam 138 across a deflection angle 162 (in dash) causing the writing dot to scan back and forth across dielectric surface 152 along trace line 155 (in dash). If desired, the pivoting light directing device may be transparent and refract the incident light beam 138 across dielectric surface 152. Scan line 156 is the most linear central portion of trace 155 and is the most suitable for printing. Mirror 160 is driven by a mechanical oscillator 164 preferably of the torsion bar type with electromagnetic drive and pickup, having a stable natural resonant frequency. The sinusoidal nature of oscillator 164 causes mirror 160 to have a nonlinear angular velocity resulting in a nonlinear scanning velocity on dielectric surface 152. Rate controller 120 introduces a cosine variation rate in the modulation rate of beam 138 to compensate for the sine variation of the scanning velocity to establish a constant writing rate per unit length of scan line 156. In addition, rate controller 120 defines the writing margins within trace line 155 at each end of scan line 156. A SYNC signal from oscillator 164 communicates the start of each oscillation cycle to controller 120. The intensity modulations of beam 138 affect the charge distribution on dielectric surface 152 forming a charge image on drum surface 152 as drum 154 turns. Toner 180 selectively clings to dielectric surface 152 as drum 154 rotates the charge image through toner bath 182. The toner on drum surface 152 is transfered to paper 108 which is rolled between drum 154 and a print roller 184 forming toned image 104. The imaging process is described in more detail in the book entitled "Electrophotography" by Schaffert.

IMAGE QUALITY

FIG. 2 shows a typical alpha-numeric symbol 200 formed by small bit elements 210 printed by scanner-printer 100. The symbols preferably have the conventional 7×5 element format wherein each element 210 corresponds to a single data bit in data base 110 and is written on drum surface 158 by a single DATA OUT pulse modulation of beam 138. A conventional letter size of 4 points in this 7×5 format requires 1088 data bits to print a single 8¼-inch scan line of bit elements, about 7.35 mils per bit. Seven such scan lines are required to produce a single line of alpha-numeric symbols. Mirror 160 oscillates at 640 cps making one complete back and forth scan in 1.56250 milliseconds. Only the most linear 43% of trace line 155 is actually employed in scan line 156 for writing. The actual printing time required for a single 8¼-inch scan in one direction is about 370 $\mu$seconds. Therefore, the conventional symbol size and bit format require that each bit be printed within 0.3125 microseconds in a 7.35 × 7.35 mil space with a deviation error undetectable by the unaided eye. The printing samples of scanner-printer 100 were surprisingly crisp and linear in view of the stringent requirements.

The crispness of image 104 is determined by the mechanical precision of printer 100 and by the definition of the writing spot. Optics 140 may provide columnating apertures for eliminating spurious or fringe light. Fuzzy edges around the writing spot may also be reduced by providing a mirror which is smaller in area than the cross-section of beam 138. The mirror clips the beam just prior to imaging, eliminating the peripheral light which is the primary source of edge noise and random background writing. Reducing the mirror size has the added advantage of increasing the oscillation frequency because of the lower angular inertia. A concave clipping mirror may provide the desired focus as well as columnation to reduce the complexity of optics 140. The mirror may be twin-mounted on the double torsion bar geometry shown in FIG. 1 which provide counteractive torques for reducing resonant vibrations throughout mechanical oscillator 164. In order to reduce swaying, the torsion bar may be secured at both ends as shown in FIG. 4.

VARIABLE CLOCK TO MATCH SCANNING VELOCITY VARIATIONS

FIG. 3 shows sine trace path 155 of modulated beam 138 on moving dielectric surface 152. The drum motion in FIG. 3 has been exaggerated relative to the scan motion to emphasize the sinusoidal nature of beam trace line 155. The horizontal and vertical positions of beam 138 are given by horizontal position $= X = A$ sine KB
vertical position $= Y =$ (drum velocity) (time)

where A is the amplitude of deflection, B is one-half of the instantaneous deflection angle 162, and K is a normalizing constant $= 90°/B_{max}$. The horizontal component of the velocity of beam 138 is $$\text{horizontal velocity} = X' = d(A \text{ sine } KB)dt = A \text{ cosine } KB$$

The horizontal velosity (bold line 320) is not constant and would print data having a constant flow rate in an unevenly spaced manner (shown by dots 330 spaced at time intervals of 128 units). Only 17 of the 1088 bit elements — every 128th element — are shown printed on trace 155. The conventional clock time of each bit element is given adjacent to the corresponding dot 330. The printing begins at the left-hand margin 166L of dielectric surface 152 and terminates at the right-hand margin 166R. The function of data rate controller 120 is to provide a variable clock (VAR CLK) which adjusts the flow rate of DATA IN to match the nonlinear horizontal scan velocity of beam 138. VAR CLK increases in frequency as beam 138 increases in velocity from left-hand margin 166L to center scan 360, and VAR CLK decreases in frequency as beam 138 decreases in velocity between center scan 360 and right-hand margin 166R. VAR CLK frequency (the velocity of DATA IN) matches the periodic variations in the scan velocity close enough to avoid visible nonlinearities in the picture element distribution along each scan line.

Many possibilities exist for providing a variable clock to synchronize the data flow rate with the scanning velocity. A cosine control signal could be provided to control the clock rate of controller 120 in analog fashion. Alternatively, the digital technique described in FIGS. 4 and 5 may be employed. Multiple clock rates are generated and selectively applied during different segments of the sinusoidal scan cycle to minimize the discrepancy between the modulation rate and the scan velocity. The slowest clock is applied during the first or left-hand segment of scan 156. Subsequent clocks increase in frequency to match the increase in scan velocity and increase in duration of application because scan line 156 becomes progressively more linear as the writing dot approaches center line 360. The clocks are then applied in reverse order for the right-hand side of scan line 156 concluding with the lowest frequency clock at right-hand margin 166R.

In the FIG. 4 embodiment scan line 156 is divided into eight segments requiring four separate clock frequencies as follows:

|  | Start Clock | Stop Clock | Number of Bits | Frequency |
|---|---|---|---|---|
| Clock I | 0 | 32 | 32 | 2.400 |
| Clock II | 33 | 160 | 128 | 2.618 |
| Clock III | 161 | 288 | 128 | 2.800 |
| Clock IV | 289 | 544 | 256 | 3.200 |
| Clock IV | 545 | 800 | 256 | — |
| Clock III | 801 | 928 | 128 | — |
| Clock II | 929 | 1056 | 128 | — |
| Clock I | 1057 | 1088 | 32 | — |

DIGITAL DATA RATE CONTROLLER

FIG. 4 shows data rate controller 120 and mechanical oscillator 164 in more detail. A SYSTEM START pulse from an operator or external control starts system control 410 and drum 154. System control 410 provides control signals to various blocks of rate controller 120 for coordinating the operation thereof (see FIG. 5). Mechanical oscillator 164 continually provides a SYNC pulse at $X=0$ each cycle to system control 1410. System control 410 responds to SYNC to issue START DELAY. START DELAY activates delay circuit 420 which, after a predetermined delay period, in turn activates bit counter 430 by a START LINE voltage. The delay period permits the writing spot to move from $X=0$ to left-hand margin 166L, the start of scan line 156. Bit counter also identifies the beginning and ending of each of the eight scan line segments and determines the four clock frequencies by means of FREQ CONT I-IV applied to variable divider 440 divides 28 mc by 9, 10, 11, or 12 in response to FREQ CONT I-IV to obtain VAR CLK I-IV which advances bit counter 430.

PRINTER ON is issued from system control 410 to bit counter 430 after the page top margin has been established. PRINTER ON causes bit counter 430 to provide END OF LINE to line counter 450 at the end of each scan line 156. Line counter 450 counts one page of scan lines — 1408 — and generates END OF PAGE which stops system control 410, and indicates the beginning of the bottom margin to the external operator or control computer. PRINTER ON also forwards VAR CLK to memory control 460 which receives RD CLK. Memory control selects VAR CLK or RD CLK in response to PRINT-READ from system control 410. PRINT-READ identifies scan line 156 within trace 155 during which the printing is done, and also identifies the nonlinear end portions of trace 155 during which DATA IN is loaded into memory 470 for the next scan line of printing. At the start of the PRINT mode memory control 460 selects VAR CLK and forwards PRESET to memory addresser 480 defining the starting address of memory 470. VAR CLK causes memory addresser 480 to count and advance across memory 470 reading DATA OUT into modulator 132. DATA OUT is printed across the scan line 156 portion of trace 155. At the start of the READ mode, memory control selects RD CLK (fixed at 1.03 mc) and forwards PRESET to memory addresser 480. The RD CLK causes memory addresser 480 to count and advance across memory 470 writing DATA IN into memory 470. Clock oscillator 490 provides 1.03 mc signal and multiples thereof for timing the operation of controller 120.

VARIABLE CLOCK TO MODIFY BEAM INTENSITY

The nonlinear scan velocity of the printing spot causes a corresponding variation in the writing time per picture element. The slower scan velocity near margins 166R and L allows more exposure time per bit than the faster scan velocities nearer the center scan 360. The charge alteration within each element is in direct proportion to the beam exposure time and beam power. The resulting toning density (image contrast) of image 104 is therefore nonlinear along the X or left-right direction due to the nonlinear scan velocity. The charge alteration varies sinusoidally as follows:

$$\text{charge alteration} = \int P \text{ (horizontal velocity) } dt$$
$$= \int PA \cos(KB) \, dt$$
$$= PA \sin(KB)$$

where $P$ is a beam power level factor. By varying $P$ and $C \cos(KB)$ then $$\text{charge alteration} = (C \cos KB)(A \sin KB) = CA$$

where both $C$ and $A$ are constants.

The beam power $P$ may be periodically varied as a cosine function to provide a uniform charge alteration by altering the amplitude rf carrier frequency to modulator 132. A power driver 170 controls the power of deflected beam 138 in response to an rf carrier from a suitable rf source such as 40 mc oscillator 172. An rf modulator 174 amplitude modulates the rf carrier to vary approximately as a cosine function. Modulator 174 responds to FREQ CONT I-IV from data rate controller 120 to establish four power levels (PWR I-IV) of operation for modulator 132. DATA OUT from controller 120 causes a portion of beam 134 to deflect and FREQ CONT I-IV determines the power level of deflected beam 138. The four power levels are activated at the same time and for the same duration as Clocks I-IV as noted in the preceding table. The lowest power level is in effect during Clock I when the scanning velocity is the lowest. The highest power level is in effect during Clock IV when the scanning velocity is greatest and the exposure time is least. Beam 138 needs more power during Clock IV to establish the same charge alteration and image contrast as the lower power-lower velocity clock periods. The output amplitude of rf modulator 174 is adjusted to approximate that portion of $A$ cosine $KB$ which corresponds to the most linear portion of $X$ deflection $A$ sine $KB$. That is, the four amplitudes corresponding to PWR I-IV should be porportional to the clock frequencies of the corresponding Clocks I-IV.

DETAILED DESCRIPTION OF THE PREFERRED EMBODIMENT

Data base 110 may be a high-speed retrieval system in which tape data is transfered to a disc and then to a solid state memory buffer which interfaces with data rate controller 120.

Modulator 132 may be a Zenith acoustical optic modulator, Model No. M40R.

Energy source 136 may be a 2-10 milliwatt helium neon laser lamp from Hughes Electronic Corp. or any suitable single frequency light source such as a mercury vapor lamp.

Optics 140 may be a beam expander type optical system from Oriel Co., Model No. B-33-60, for focusing modulated laser beam 138 onto dielectric surface 152, with a spatial filter for defining the energy distribution of the scanning spot.

Mechanical oscillator 164 may be a mechanically resonant galvonometer type scanner with electrical drive and pickup such as Model L-44 from Bulova Watch Co.

Delay circuit 420 is a 12-bit counter clocked by a 14.4 MHz signal formed by three 4-bit counters (SN 9316) in cascade. The delay accommodates the time elapsing between SYNC (when galvo is at $X=0$) and START LINE (when the scanning beam is at the left-hand margin 166L of the scan line 156). START DELAY presets a control flip flop (SN 74S74) which starts the 12-bit counter, and START LINE resets the control flip flop.

Bit counter 430 may be a 12-bit counter formed by three 4-bit modular counters (SN 9316) in cascade for counting the 1088 bits of each scan line 156. Bit counter 430 also includes an $8 \times 32$ PROM (Programmable Read Only Memory) (SN 8223) responsive to six counts which determine the boundaries of the eight segments (counts 32, 160, 288, 800, 928, and 1056). The PROM provides three binary bits of control frequency data to variable divider 440.

Variable divider 440 may be a programmable counter (9316) and an inverter (7404) connected in feedback configuration which are responsive to the three bits of control frequency data for dividing a 28.8 mc clocking signal by 9, 10, 11, and 12 to provide VAR CLK I-IV.

Line counter 450 may be a 12-bit counter formed by three 4-bit counters (SN 9316) in cascade for counting the 1408 scan lines in each data block or page.

Memory control 460 may be formed by:

a. a print one shot and a read one shot (74123) responsive to PRINT-READ for presetting memory addresser 480 to 0 and 1088;

b. a clock selecting flip flop (7474) preset by the print one shot and cleared by the read one shot; and c. an AND OR gate (74152) responsive to the flip flop for gating the selected clock to the memory addresser 480.

Memory 470 may be a 1088 RAM formed by five 256-bit RAM (55SO73) for storing a single scan line of 1088 bits.

Memory addresser 480 may be a 12-bit counter formed by three up-down counters (74193) for identifying the read and write addresses of memory 470.

Clock oscillator 490 may be an LC oscillator and frequency divider for providing squarewaves at 288 mc, 14.4 mc, 7.2 mc, and 1.03 mc.

Driver 170 may be any linear amplifier capable of providing at least two watts of output power at 40 mc.

RF oscillator 172 may be any 40 mc sinusoidal coherent signal generator.

RF amplitude modulator 174 may be any wide band (at least 0-4 mc) modulator with D/A input.

CONCLUSION

Accordingly the objects of this invention have been accomplished by employing a simple mechanical resonator to provide the X or scan line deflection of the scanning beam. The resonator has a natural frequency of resonance which is a function of mass and is not affected by wear or aging. The torsion bar construction does not involve discrete moving parts with bearing surfaces which lose alignment under wear or impact. The mechanical oscillator is inexpensive to manufacture because it does not require closely machine surfaces or a constant speed drive. A variable clock is provided for matching the instantaneous data flow rate to the instantaneous scanning velocity. The variable clock varies the instantaneous power level of the scanning beam to provide even contrast in the printed image.

It will be apparent to those skilled in the art that various changes may be made in the apparatus described without departing from the scope of the invention. For example, the variable clock may be modified to account for other sources of nonlinearity in addition to the nonlinear scan velocity. The slight distortion near margins 166L and R due to the flatness of recording medium 108 (the pin cushion effect) may be eliminated by a slight modification of Clocks I–IV. Further, desirable nonlinearities may easily be introduced by modifying the variable clock.

We claim as our invention:

1. A digital system for recording digital input data onto an energy-responsive recording medium by scanning the recording medium with a modulated energy beam, comprising:
    a mechanical oscillator means having a sinusoidal displacement characteristic;
    energy-directing means responsive to the sinusoidal displacement of the oscillator means for causing the energy beam to scan in a predetermined pattern across the recording medium at a sinusoidally varying rate;
    controller for coordinating the data flow rate of the input data to approximately match the sinusoidal velocity of the energy beam across the recording medium by establishing a periodic series of constant data flow rates which are in effect for predetermined portions of the sinusoidal velocity function; and
    modulator means responsive to the input data from the controller for modulating the energy beam prior to scanning by the energy-directing means.

2. The scanner of claim 1, wherein the mechanical oscillator is a resonant device with a natural frequency of resonance.

3. The scanner of claim 2, wherein the resonant mechanical oscillator has an arcurate oscillatory displacement.

4. The scanner of claim 3, wherein the energy beam is a light beam.

5. The scanner of claim 4, wherein the energy-directing means is an optical device.

6. The scanner of claim 5, wherein the optical energy-directing device is arcurately displaced in response to the arcurate oscillatory displacement of the resonant mechanical oscillator.

7. The scanner of claim 6, wherein the resonant mechanical oscillator is a torsion bar device which supports the light-directing optical device and oscillates about its longitudinal axis.

8. The scanner of claim 7, wherein the torsion bar oscillator is electromagnetically activated by a drive coil.

9. The scanner of claim 7, wherein the arcurate displacement of torsion bar oscillator is electromagnetically monitored by a pickup coil to provide periodic synchronization signals to the flow rate controller.

10. The scanner of claim 6, wherein the resonant mechanical oscillator is formed by twin torsion devices mounted in counteractive relationship.

11. The scanner of claim 6, wherein the optical energy-directing device is transparent and refracts the incident light beam across the recording medium.

12. The scanner of claim 6, wherein the optical energy-directing device has a reflective surface for reflecting the incident light beam across the recording medium.

13. The scanner of claim 12, wherein the area of the reflective surface is less than the cross-section of the beam causing the beam to be clipped to the dimensions of the reflective surface.

14. The scanner of claim 1, wherein the controller provides a series of predetermined clock frequencies which determine the series of constant data flow rates for predetermined segments of the sinusoidal displacement.

15. The scanner of claim 1, wherein the modulating means is additionally responsive to the controller for varying the intensity of the energy beam in direct proportion to an approximation of the sinusoidal motion of the energy beam across the recording medium established by the series of constant data flow rates.

16. The scanner of claim 15, wherein the modulator means comprises:
    an rf oscillator for providing an rf carrier signal;
    an amplitude modulator response to the controller for controlling the amplitude of the rf carrier signal; and
    a means for varying the intensity of the energy beam incident upon the recording medium by deflecting the energy beam in response to the input data from the controller, and also in response to the rf carrier at a deflection level corresponding to the amplitude of the rf carrier.

17. Apparatus for printing input data onto a laser-responsive recording medium, comprising:
    a controller for providing a series of constant flow rates for input data which approximately match a sinusoidal function;
    a laser source means for providing a laser beam;
    a modulator responsive to the input data from the controller for modulating the laser beam;
    a torsion oscillator for providing a resonant sinusoidal angular motion;
    a laser beam deflecting means responsive to the angular motion for causing the modulated laser beam to scan the recording medium periodically along a scan line at a sinusoidally varying velocity;
    drive means for moving the recording medium generally traversely to the scan line permitting the modulated laser beam to generate an image thereon; and
    means for toning the image.

* * * * *